(12) United States Patent  (10) Patent No.: US 7,905,053 B2
Lisciotti et al.  (45) Date of Patent: Mar. 15, 2011

(54) POLES FOR SUPPORTING GROWING PLANTS

(76) Inventors: Loretta E. Lisciotti, Leominster, MA (US); Henry P. Lisciotti, Jr., Leominster, MA (US)

( * ) Notice: Subject to any disclaimer, the term of this patent is extended or adjusted under 35 U.S.C. 154(b) by 131 days.

(21) Appl. No.: 12/229,961

(22) Filed: Aug. 26, 2008

(65) Prior Publication Data

US 2009/0077879 A1  Mar. 26, 2009

Related U.S. Application Data

(60) Provisional application No. 60/994,607, filed on Sep. 20, 2007.

(51) Int. Cl.
*A01G 17/04* (2006.01)
(52) U.S. Cl. .......................................................... 47/47
(58) Field of Classification Search ................. 47/42–45, 47/47, 70, 39, 41.13; 248/157, 408, 423, 248/407, 159, 161, 27.8, 128, 132, 125.8; 135/118; 52/155, 165; 119/786, 787
See application file for complete search history.

(56) References Cited

U.S. PATENT DOCUMENTS

| 291,569 | A | * | 1/1884 | Borner | 47/47 |
| 918,579 | A | * | 4/1909 | Murch | 248/353 |
| 3,165,863 | A | * | 1/1965 | Duran | 47/47 |
| 4,096,662 | A | * | 6/1978 | Anderson | 47/70 |
| 5,349,780 | A | * | 9/1994 | Dyke | 47/47 |
| 7,624,534 | B1 | * | 12/2009 | Maeder | 47/47 |

* cited by examiner

*Primary Examiner* — Rob Swiatek
*Assistant Examiner* — Kristen C Hayes
(74) *Attorney, Agent, or Firm* — Pandiscio & Pandiscio (57) ABSTRACT

A telescoping pole for supporting growing plants comprises two or more elongate pole members, one of which has a pointed stake section at one end to facilitate insertion into the ground. The pole includes means for locking the elongate pole members in a number of different telescoped positions, whereby to allow for adjustment of the effective length of the pole according to the height of the plant that it supports. The telescoping members are made of a polymer material, with at least one of the telescoping members comprising two injection-molded component parts that are mechanically attached to one another.

13 Claims, 14 Drawing Sheets

POLES FOR SUPPORTING GROWING PLANTS

This application claims the benefit of Provisional Patent Application No. 60/994,607, filed Sep. 20, 2007 by Loretta E. Lisciotti.

FIELD OF THE INVENTION

The present invention relates to an apparatus for supporting plants, e.g., tomato plants, shrubs, trees, etc., so as to facilitate their growth.

BACKGROUND OF THE INVENTION

Heretofore efforts have been expended to provide support structures for growing plants in order to promote their growth and to prevent damage caused by the breakage of portions of the plant. For example, the total weight of tomatoes on a tomato plant may prevent the stalk from growing straight and upright, ultimately resulting in damage and loss of product. A common approach has been to tie growing plants to support poles in the form of a simple wooden stick. However, that form of support pole has a fixed length, which may be insufficient to support the plant as it grows to its maximum height. On the other hand, particularly in the case of ornamental plants located indoors, using a long support pole for a relatively short and slow-growing plant does not provide an aesthetically pleasing appearance.

OBJECTS AND SUMMARY OF THE INVENTION

A primary object of the invention is to provide telescoping poles for use in supporting growing plants that may be stored in a neat and compact manner.

Another object of the invention is to provide a plant support pole which may be used indoors as well as outdoors.

A further object of the invention is to provide a pole for the purpose described that comprises two or more telescoping members made of a polymer plastic material.

Still another object is to provide a plant support pole comprising two or more injection-molded telescoping members.

A more specific object is to provide a telescoping plant support pole that can be locked in various extended positions.

Another object is to provide a pole for the purpose described that has means for accommodating flexible means for tying the pole to a growing plant.

To accomplish these objects, the present invention is directed to a novel telescoping pole structure comprising two or more elongate pole members, with one of those members being provided with a pointed stake section at one end to facilitate insertion into the ground. The pole includes means for locking the elongate pole members in a number of different telescoped positions, whereby to allow for adjustment of the effective length of the pole according to the height of the plant that it supports. The telescoping members are made of a polymer material, with at least one of the telescoping members comprising two injection-molded component parts that are mechanically attached to one another. Other features and advantages of the invention are described in or rendered obvious by the following detailed description of a preferred embodiment of the invention which is to be considered together with the accompanying drawings.

THE DRAWINGS

Like numerals are used in the several figures to identify like parts. In a number of the lines, portions of the pole member have been broken away because of space limitations.

DETAILED DESCRIPTION OF THE INVENTION

Referring to FIGS. 1-4, the preferred embodiment of the pole-supporting pole of the invention consists of three elongate members 2, 4, and 6 disposed in telescoping relation with one another, with the member 2 being the outermost member, the member 6 being the innermost member, and the member 4 being an intermediate member that slidably extends within member 2 and surrounds and is in sliding relation with member 6 (from the perspective of using to support a growing plant, the members 2 and 6 may be viewed as being the bottom and top pole members respectively). Elongate pole member 2 is formed in two component halves or parts 10 and 12 (FIGS. 5-11), elongate intermediate member 4 is formed in two halves or parts 14 and 16 (FIGS. 12-19), and elongate member 6 is a solid one-piece part (FIGS. 20-24). All of the parts 6, 10, 12, 14, and 16 are molded of a polymer material. By way of example but not limitation, they may be made of polyethylene, polypropylene, or some other suitable moldable material capable of providing a suitable combination of resiliency and adequate strength against breaking.

Referring now to FIGS. 1-9, component part 10 comprises an elongate shaft section 20 and an elongate stake section 22. Shaft section 20 has a generally U-shaped configuration in cross-section. As seen best in FIGS. 7-9, shaft section 20 comprises a flat base wall 26 and stepped side walls 28 that terminate in outwardly-projecting flanges 30. The latter are interrupted at several spaced locations with L-shaped locking tabs 32 that project outwardly away from flanges 30, as shown best in FIGS. 5, 7 and 9. The junction of shaft section 20 with stake section 22 is demarcated by a relatively large radially projecting flange 34 that extends through an angle of 180° and is terminated by straight edge 36. The edge 36 is interrupted by a co-planar and projecting key section 38.

Figure 26:
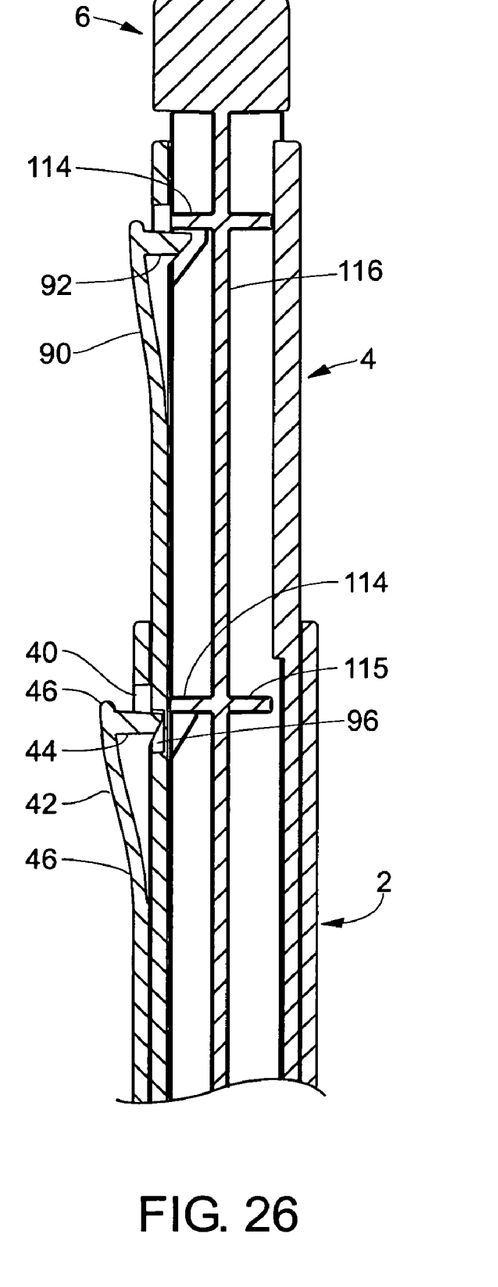
FIG. 26 is a longitudinal sectional view taken along line 26-26 of FIG. 25.

As seen best in FIGS. 5, 8, 25 and 26, the flat base wall 26 of component part 10 is formed with a U-shaped slot 40 that borders a relatively large locking tab 42 on three sides. Tab 42 is essentially tongue-like, having one end formed integral with base wall 26 and its other end free and characterized by a lock projection 44 and a lip 46. Tab 42 is formed so that at its free end it projects outwardly of base wall 26 but with its lock projection 44 extending inwardly of the inner surface of base wall 26. The inner end surface of lock projection 44 is inclined as shown in FIG. 26 to facilitate a locking interaction with the intermediate pole member 4 as described hereinafter. Shaft section 20 also is formed with a plurality of mutually spaced notches 48 in its two flanges 30.

Figure 1:
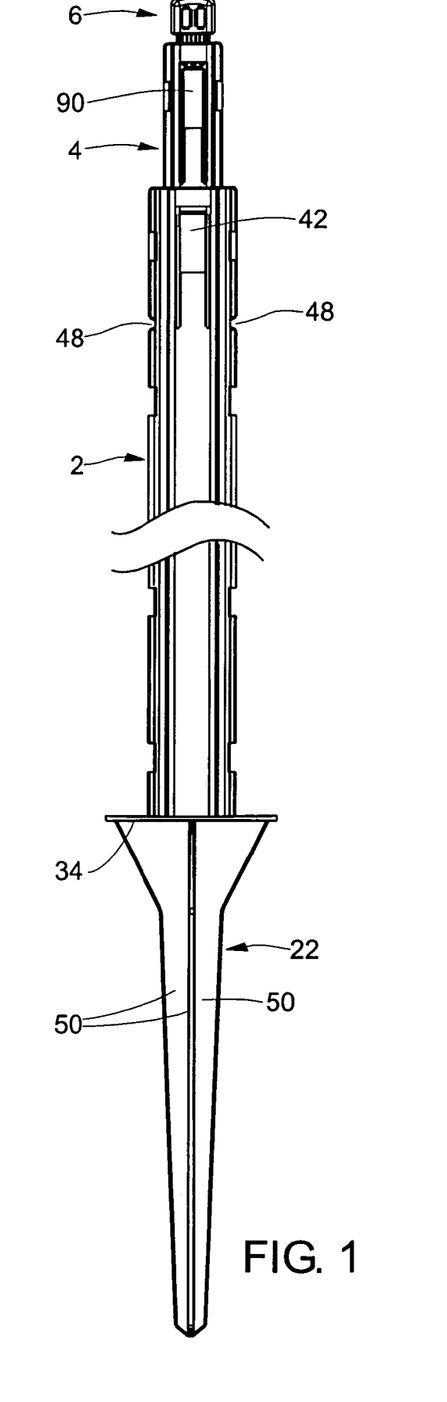
FIG. 1 is a side view in elevation of a telescoping plant support pole comprising a preferred embodiment of the invention, with the pole consisting of three elongate members and with the pole shown in fully collapsed (i.e., retracted) position.
Figure 2:
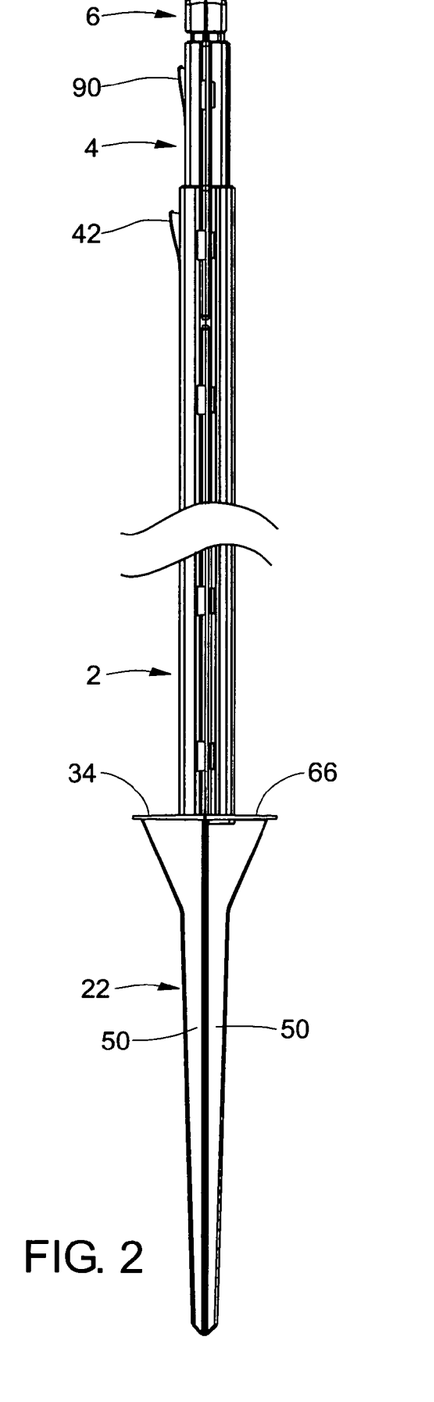
FIG. 2 is a view of the same pole in fully collapsed (retracted) position taken at a right angle to the viewing position of FIG. 1.
Figure 3:
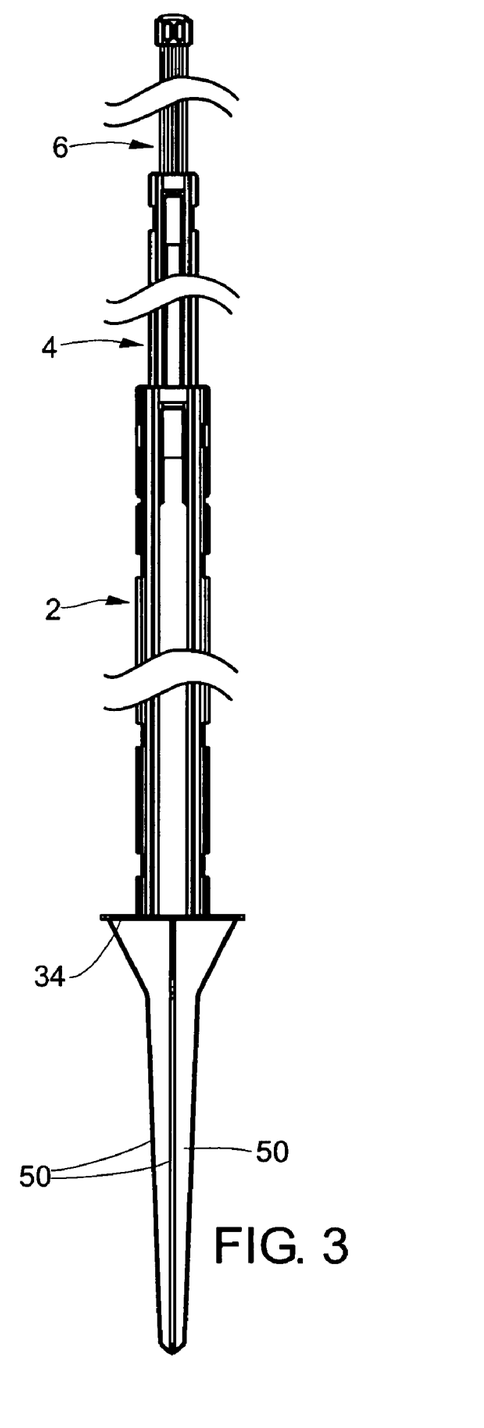
FIG. 3 is a view similar to FIG. 1 but showing the pole in fully extended position.
Figure 4:
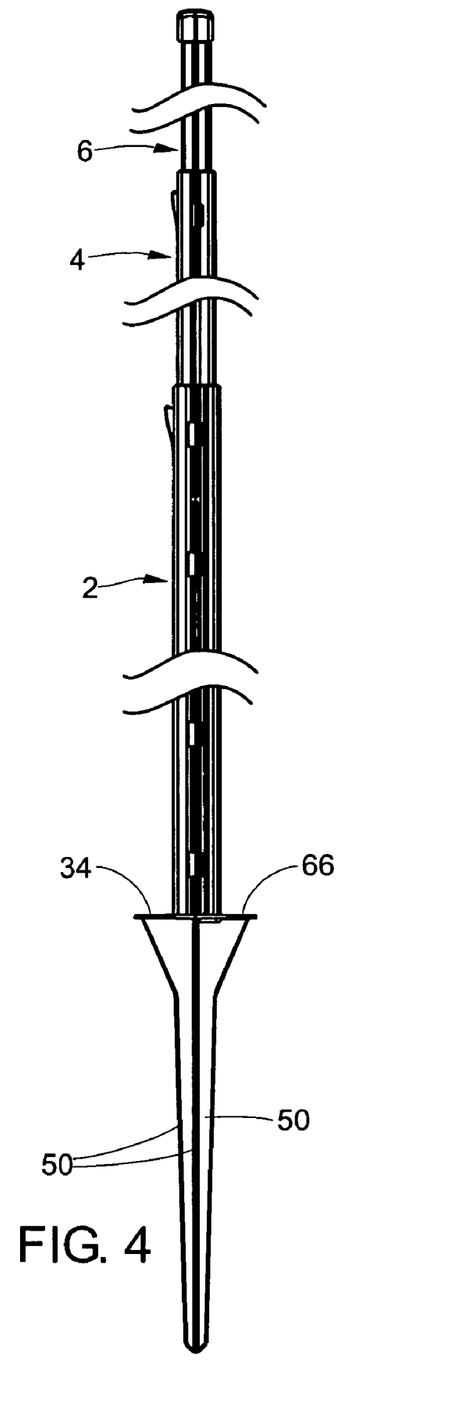
FIG. 4 is a view similar to FIG. 2 but showing the pole in fully extended position.
Figures 5, 6:
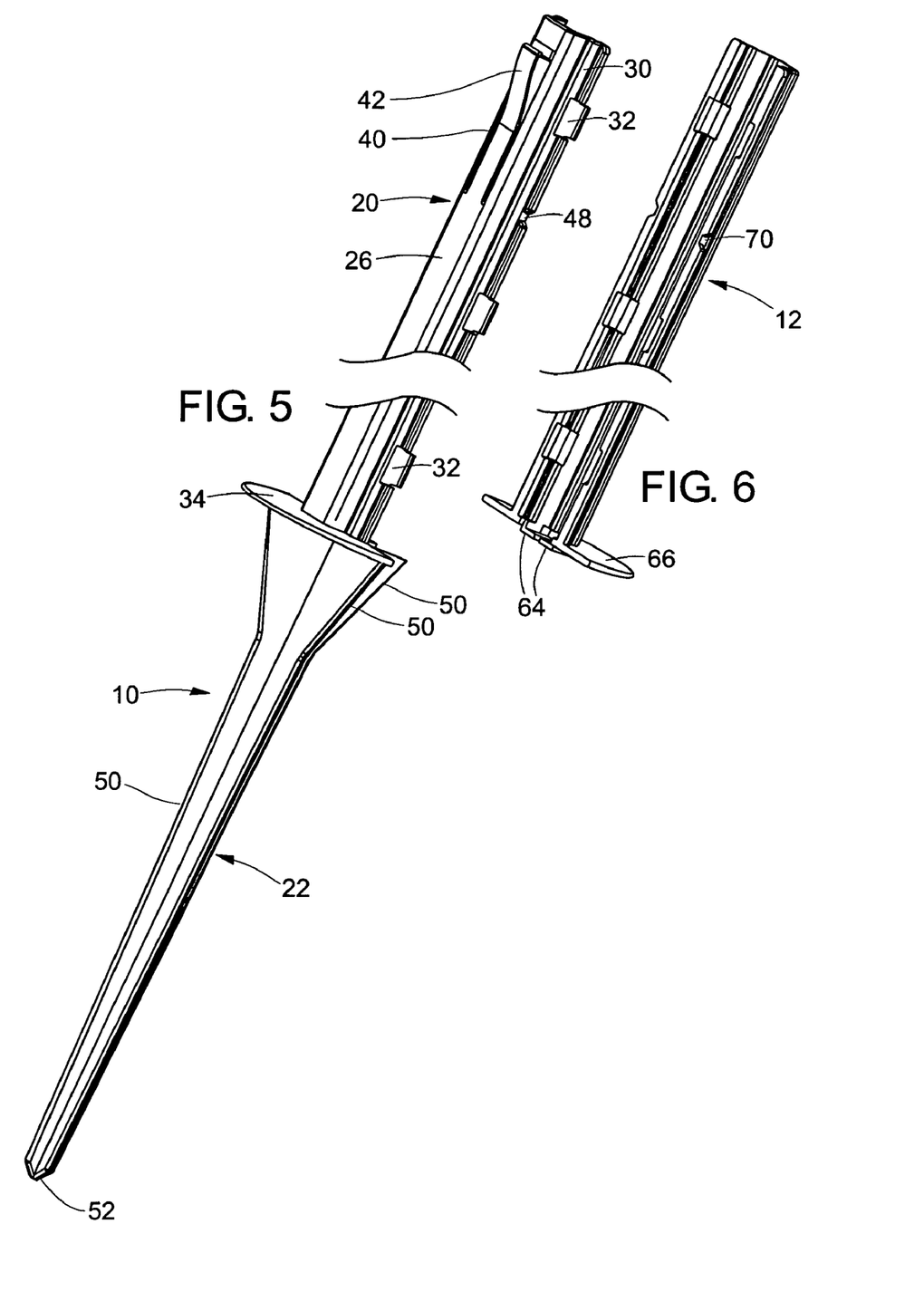
FIG. 5 is a perspective view of the first of two component parts of the outermost (bottom) elongate pole members.
FIG. 6 is a perspective view of the second of the two component parts of the outermost (bottom) elongate pole member.
Figure 7:
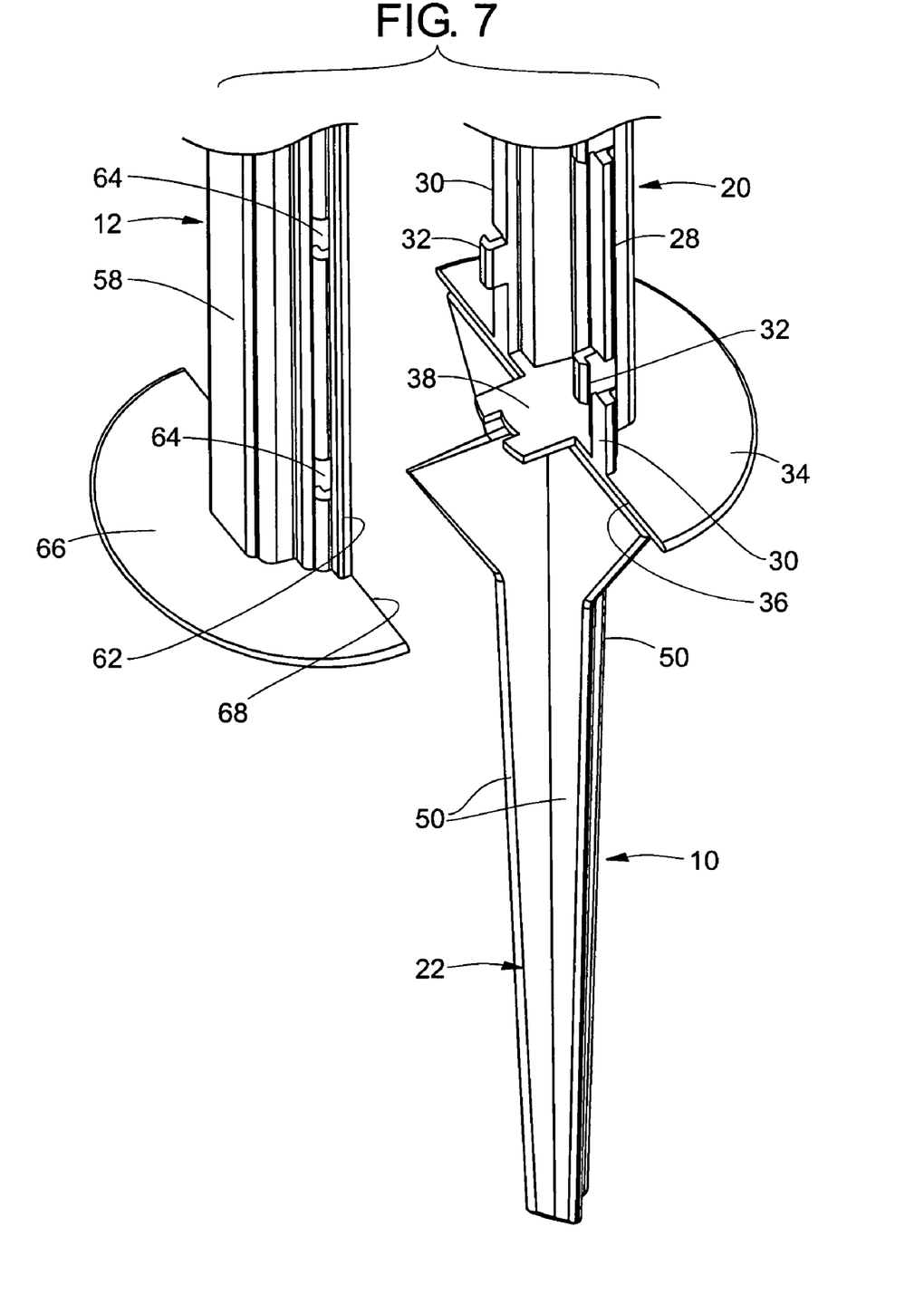
FIG. 7 is a fragmentary exploded view of the two component parts of the outermost (bottom) elongate pole member.

The stake section 22 of component part 10 comprises four like blade-shaped fins 50, with each fin extending at an angle of 90° to each adjacent fin. The fins are tapered longitudinally as shown, having expanded tapered sections at their top ends and terminating at their bottom ends in a narrow more tapered tip 52. The upper end of one of the fins projects laterally of flange 34 as seen in FIG. 7.

Referring to FIGS. 6, 7, 10 and 11, the second component part 12 of the outermost pole member 2 comprises a shaft section that is generally U-shaped in cross-section and is characterized by a flat base wall 58 and stepped side walls 60 that terminate in outwardly-projecting flanges 62. The stepped side walls 60 and flanges 62 are formed with a series of spaced openings 64 that are sized to receive the L-shaped locking tabs 32 of component part 10. The bottom end of component part 12 also is formed with a relatively large radially projecting flange 66 that extends through an angle of 180° and is terminated by a straight edge 68. The bottom end of component part 12 also is formed with a pair of tabs 69 (FIGS. 6, 10 and 11) that extend forwardly from base wall 58 below the level of flange 66. Component part 12 also is formed with a plurality of mutually spaced notches 70 (FIGS. 5 and 7) in its two outwardly-projecting flanges 62.

The two parts 10 and 12 are secured to one another by squeezing one of the component parts 10 or 12 enough to insert the L-shaped locking tabs 32 through the openings 64 in the flanges 62. It is to be noted that the two component parts 10 and 12 are made with a sufficient resiliency to allow them to flex to the extent required to allow locking tabs 32 to be inserted in openings 64 and to have the tabs tightly engage component part 12 when the squeezing force is removed. The component parts 10 and 12 also are stiff enough to form a rigid pole member as described. When this is done, the key 38 of part 10 fits into and engages the inner surface of base wall 58 and also portions of the inner surfaces of stepped side walls 60, the tabs 69 underlie the key 38, the flanges 34 and 66 are in a co-planar relationship with the straight edge of flange 66 with and engaging the straight edge of flange 34, and the notches 70 are aligned with the notches 32 of part 10. When so assembled, the two parts 10 and 12 form a substantially rigid pole member, and the matching notches 32 and 70 constitute areas adapted to receive flexible metal or organic string plant ties and keep them from slipping down on the outermost pole member.

Also, when so assembled, the base walls 26 and 58 and stepped side walls 28 and 60 of component halves 10 and 12 respectively, define a channel for slidably receiving intermediate member 4. The key section 38 and tabs 69 coact to provide radial strength to pole member 2.

Figure 8:
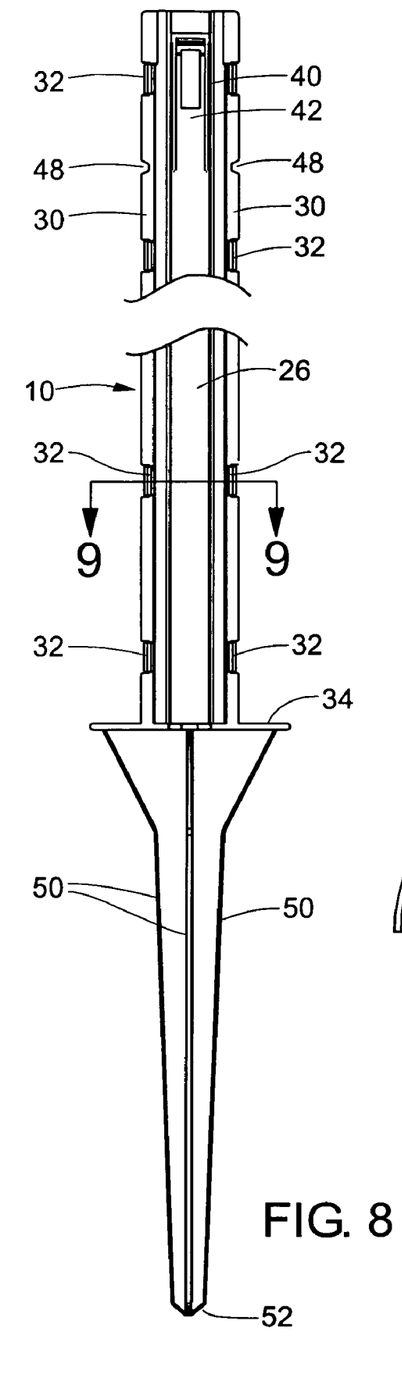
FIG. 8 is a side view in elevation of the first of the two component parts of the outermost (bottom) elongate pole member.
Figure 8A:
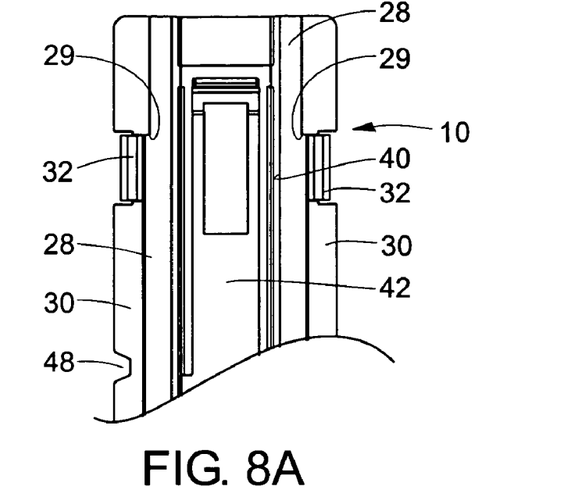
FIG. 8A is an enlargement of the upper end of the first component as shown in FIG. 8.
Figure 9:
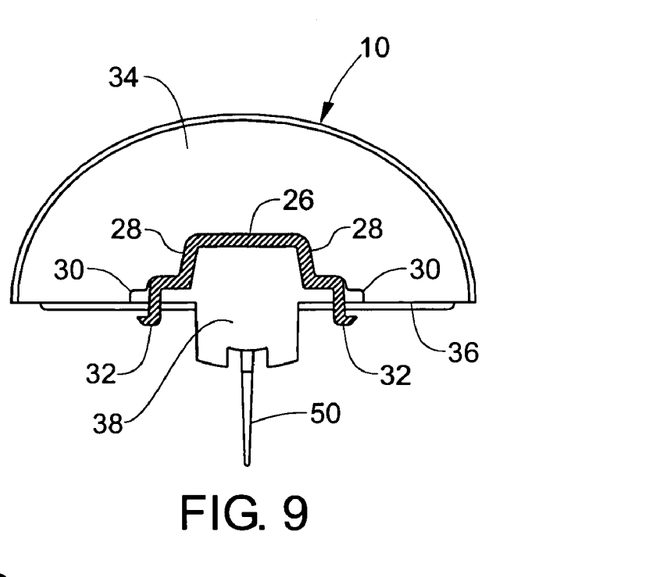
FIG. 9 is a sectional view taken along line 9-9 of FIG. 8.
Figures 10, 11:
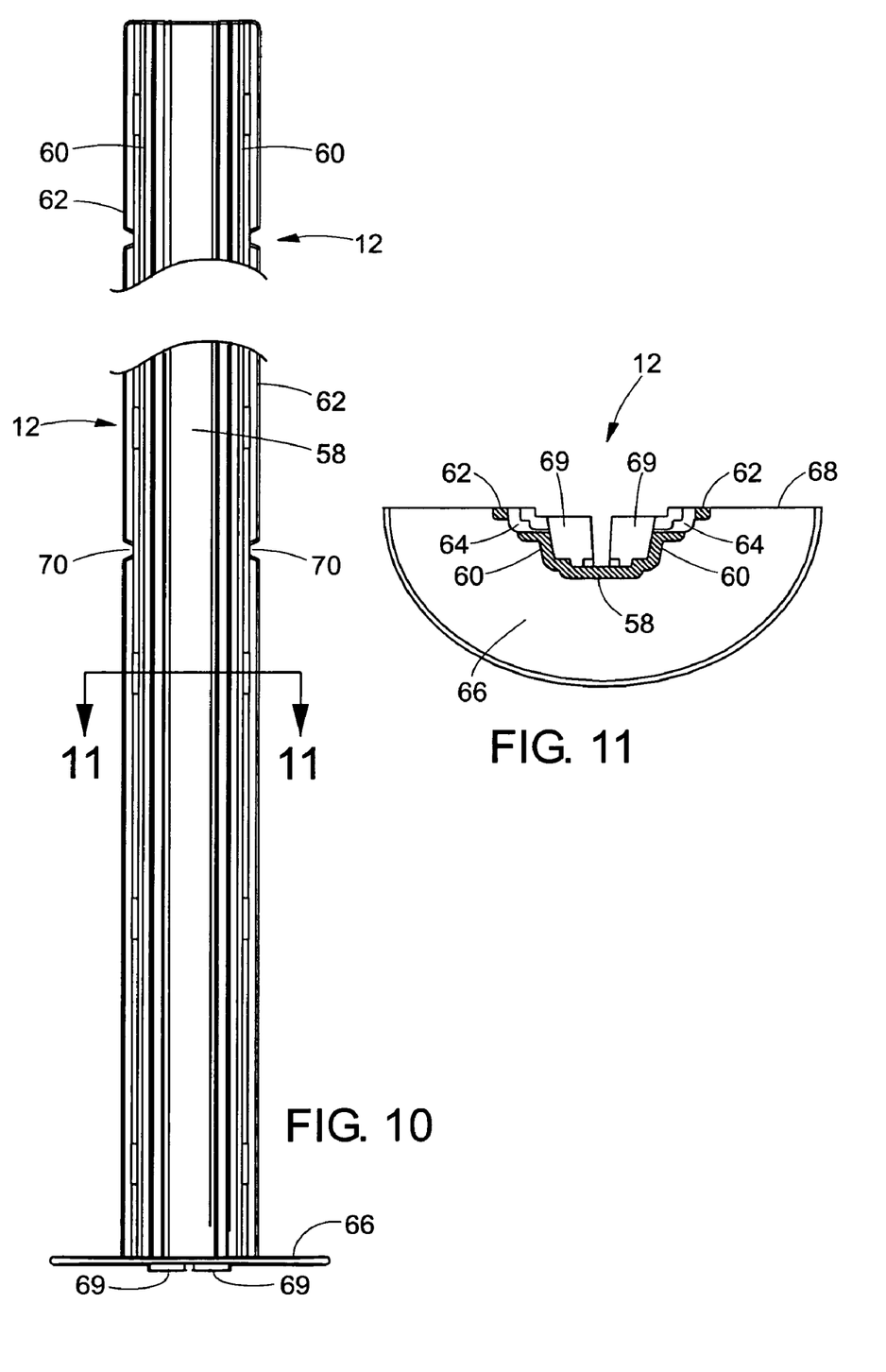
FIG. 10 is a side view in elevation of the second component part of the outermost (bottom) elongate pole member.
FIG. 11 is a sectional view taken along line 11-11 of FIG. 10.
Figures 12, 13:
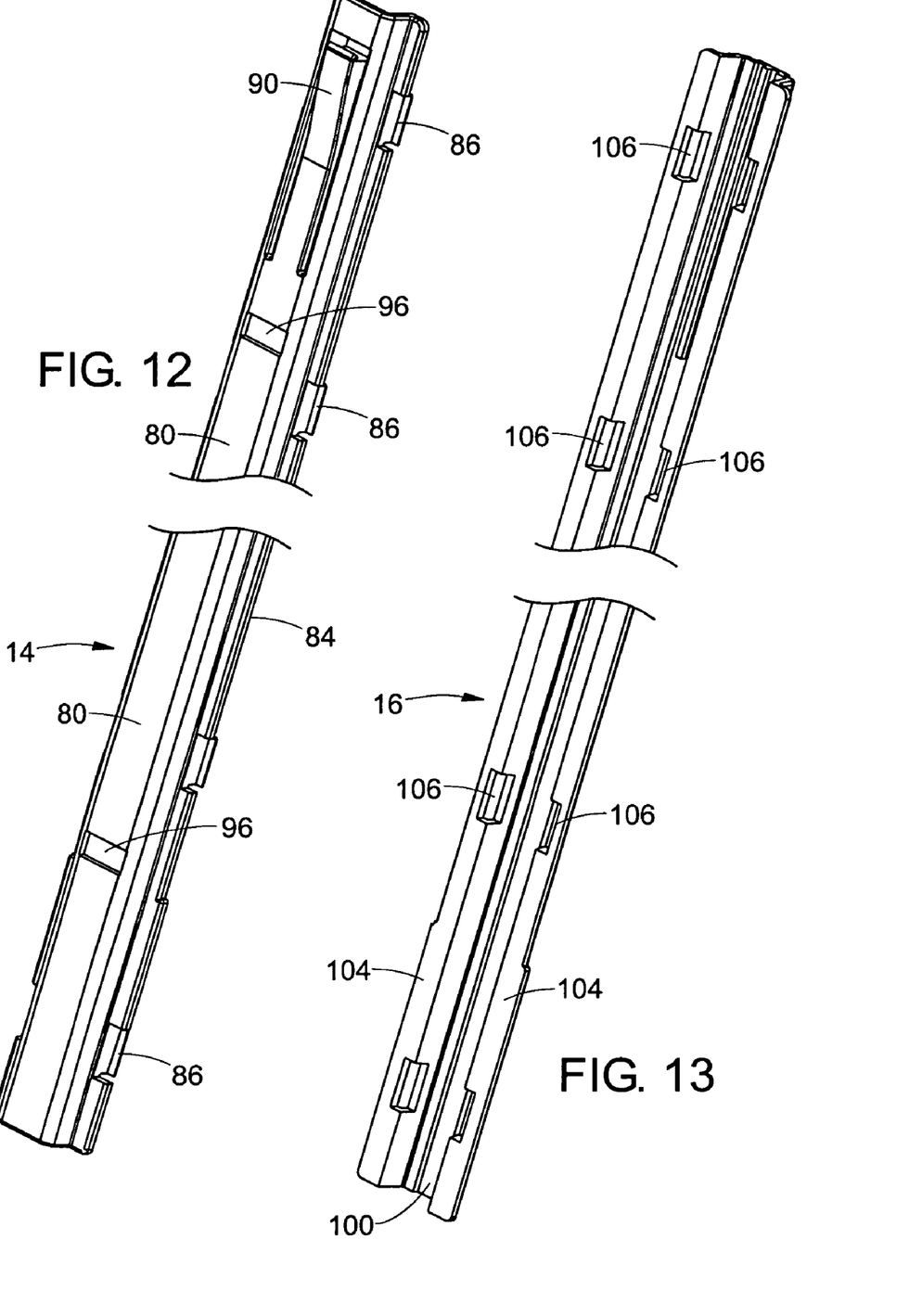
FIG. 12 is a perspective view of the first component part of the innermost (bottom) elongate pole member.
FIG. 13 is a perspective view of the second component part of the innermost (bottom) elongate pole member.
Figure 14:
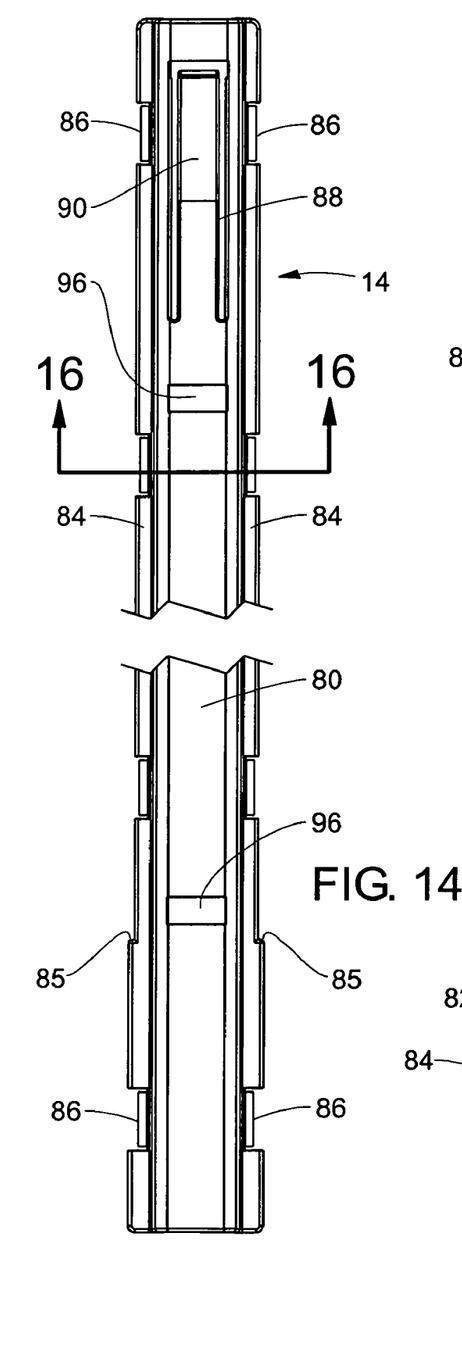
FIG. 14 is a side view in elevation of the first component part of the intermediate (middle) elongate pole member.
Figure 15:
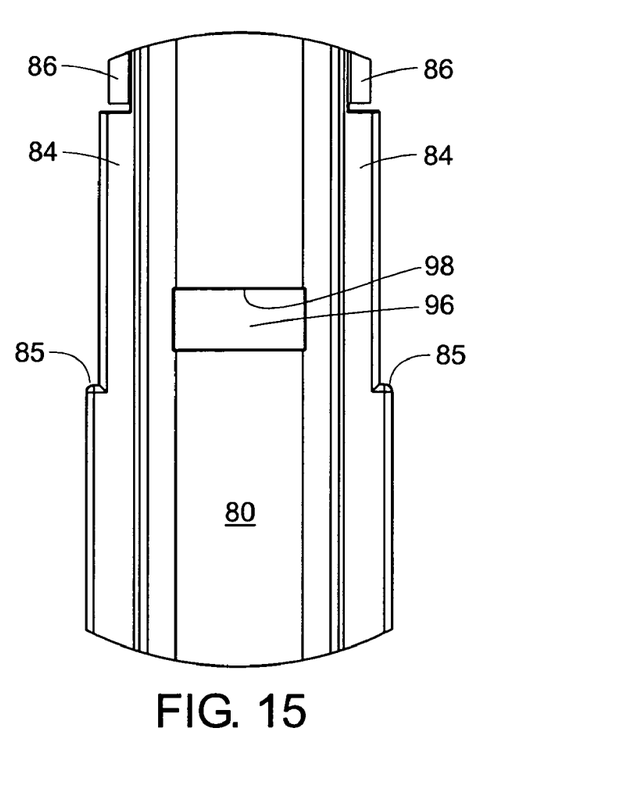
FIG. 15 is an enlargement of a portion of FIG. 14.
Figure 16:
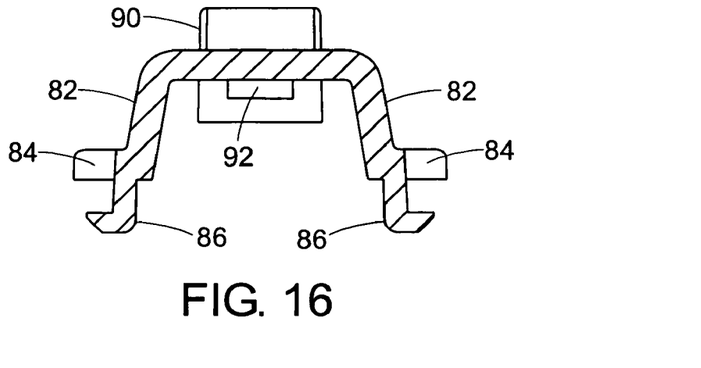
FIG. 16 is a sectional view taken along line 16-16 of FIG. 14.

Referring to FIG. 8A, a top (extended position) stop is provided for limiting the extent to which intermediate member 4 can be extended relative to outermost member 2. One half of that top stop is provided by reducing the spacing between the two stepped side walls 28 of component part 10 for a selected distance extending down from the outer (top) end of member 2, whereby to provide shoulders as indicated at 29 in FIG. 8A. Although not shown, it is to be understood that the other half of the top stop for intermediate member 4 comprises a like reduction in the spacing between the stepped side walls 60 of component part 12 for a like distance extending down from the outer (top) end of outermost member 2.

Referring now to FIGS. 12 and 14-16, the first part 14 of intermediate pole member 4 consists of an elongate shaft section with a generally U-shaped configuration in cross-section that is similar to that of component part 10 of outermost pole member 2. As seen best in FIGS. 12 and 14-16, component part 14 comprises a flat base wall 80 and stepped side walls 82 that terminate in outwardly-projecting flanges 84. The latter are interrupted at several spaced locations with outwardly projecting L-shaped locking tabs 86. The top and bottom ends of component part 14 terminate in substantially flat surfaces. The flat base wall 80 is formed with a U-shaped slot 88 that borders a relatively large locking tab 90 on three sides. Tab 90 is similar to tab 42, being essentially tongue-like, with one end formed integral with base wall 80 and its other end free and characterized by a lock projection 92 essentially the same as locking projection 44 of locking tab 42. Like the latter tab, locking tab 90 is formed so that at its free end it projects outwardly of base wall 80 but with its lock projection 92 extending inwardly of the inner surface of base wall 80. The inner end surface of the lock projection of locking tab 90 is intended to make a locking interaction with the innermost (top) pole member 6 as described hereinafter. The outer surface of base wall 80 also is formed with a series of indentations or cavities 96 (FIGS. 14, 15 and 26) that are characterized by inclined bottom surfaces so that the upper ends of the cavities are deepest at their top margin and are flush with that outer surface base wall 80 at their bottom ends, i.e., the depth of recesses 96 increases with increasing distance from the stake-like section of pole member 2. At their deepest ends, recesses 96 are terminated by a wall 98 (FIG. 15) that extends perpendicular to the longitudinal axis of pole member 4. These indentations or cavities 96 are sized to receive the lock projection of locking tab 42, as shown in FIG. 26.

Figures 17, 18:
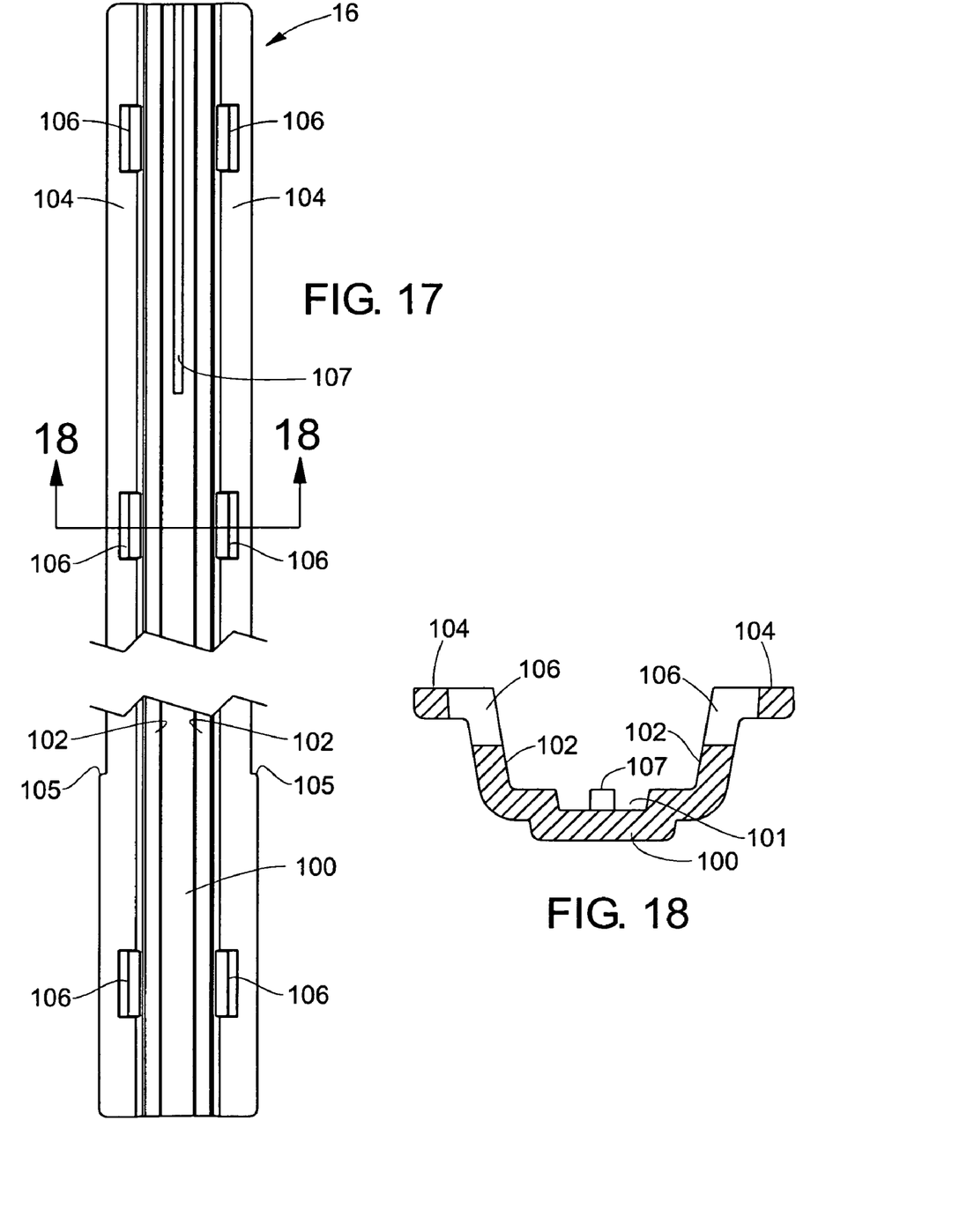
FIG. 17 is a side view in elevation of the second component part of the intermediate (middle) elongate pole member.
FIG. 18 is a sectional view taken along line 18-18 of FIG. 17.
Figure 19:
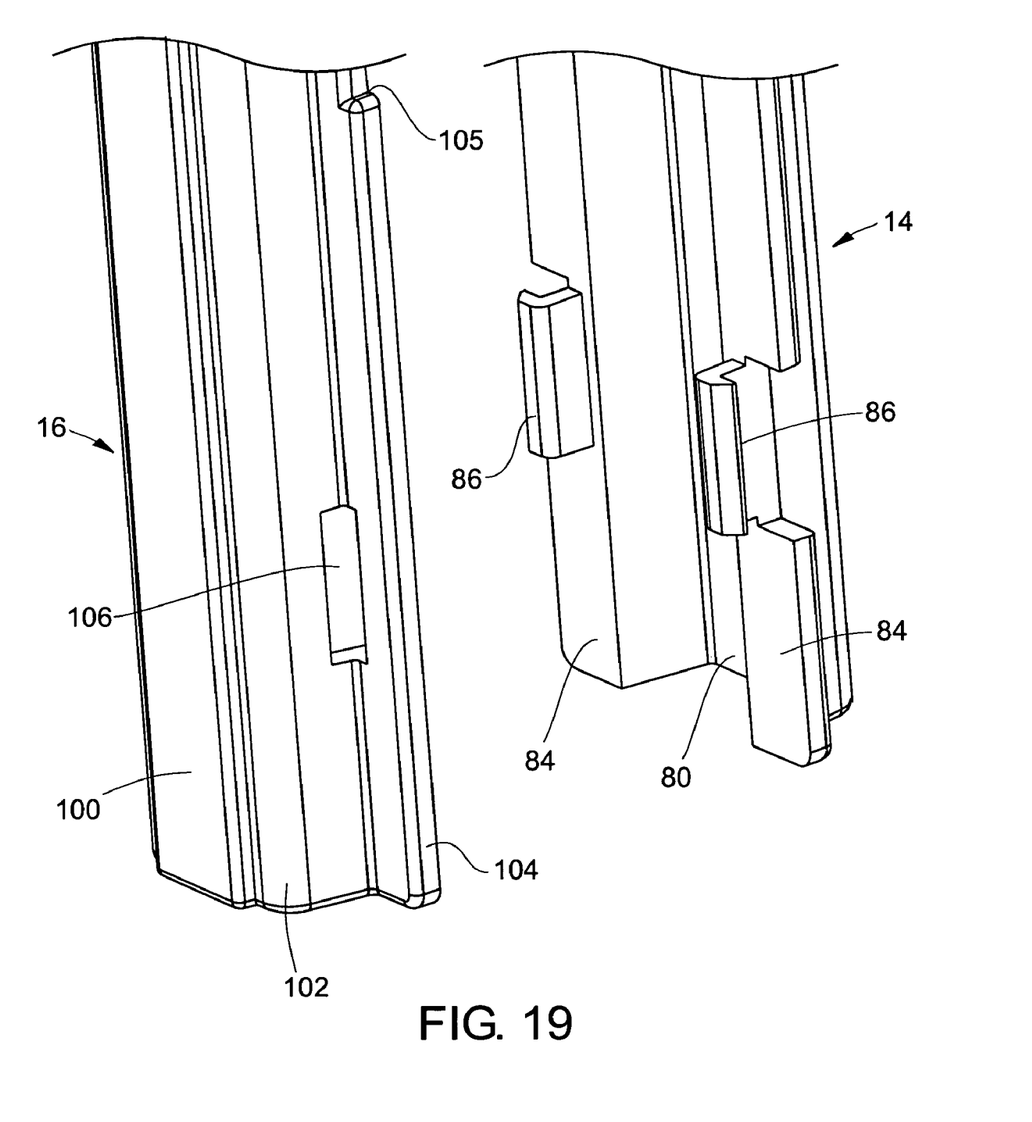
FIG. 19 is a fragmentary exploded view of the two component parts of the intermediate (middle) pole member.
Figures 20, 21:
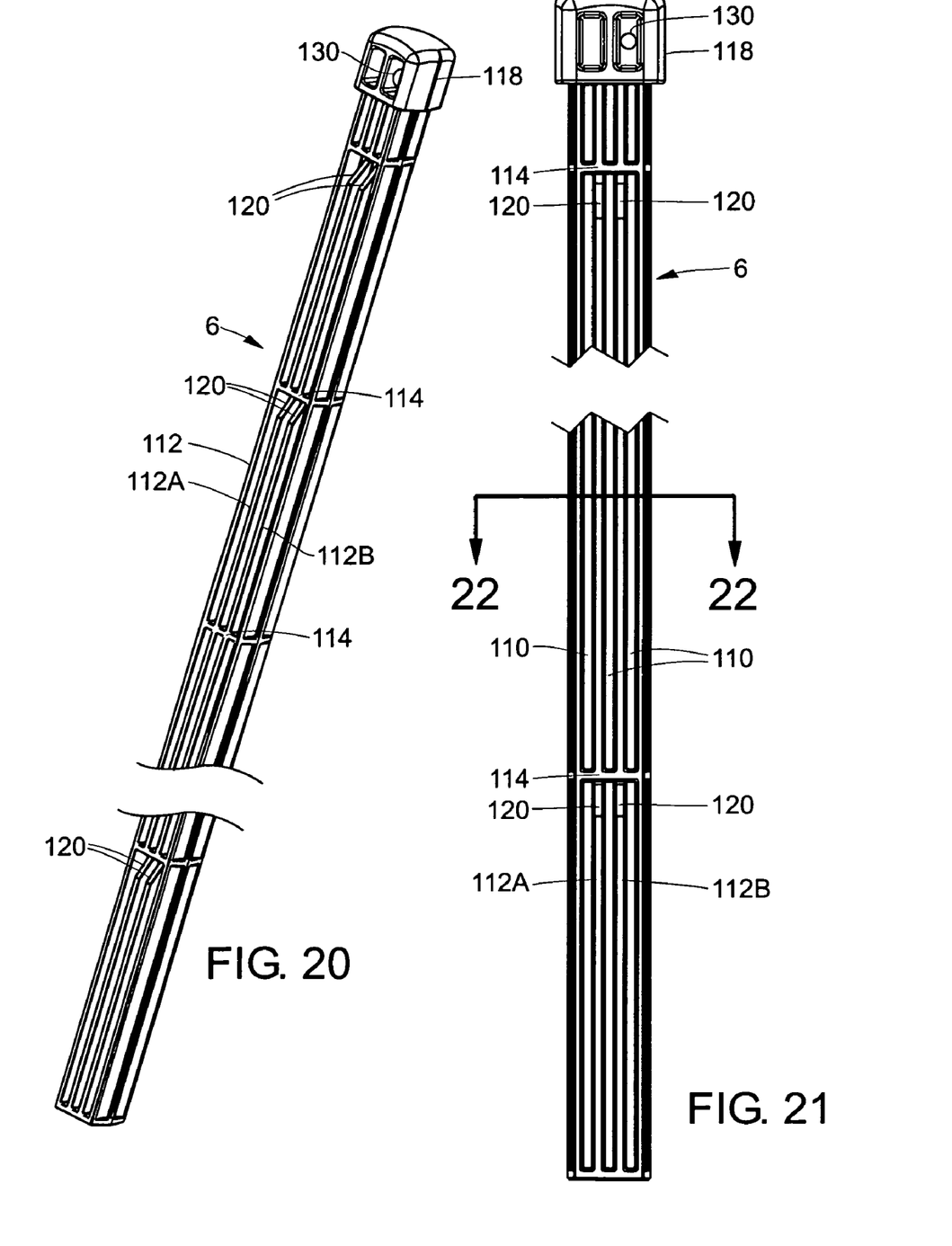
FIG. 20 is perspective view of the innermost (top) pole member.
FIG. 21 is a side view in elevation of the innermost (top) telescoping member of the pole.

Referring now to FIGS. 17-19, component part 16 of the intermediate pole member also is in the form of an elongate shaft section that is generally U-shaped in cross-section and is characterized by a flat base wall 100 and stepped side walls 102 that terminate in outwardly-projecting flanges 104. The stepped side walls 102 and flanges 104 are formed with a series of spaced openings 106 that are sized to receive the L-shaped locking tabs 86 of component part 14. Both component parts 14 and 16 are formed with substantially flat end surfaces. The two parts 14 and 16 are secured to one another by squeezing one of them enough to insert the L-shaped locking tabs 86 into the openings 106 in flanges 104. Like the component parts 10 and 12, the two parts 14 and 16 have sufficient resiliency to allow them to flex to the extent required to allow tabs 86 to be inserted in openings 106. When this is done, the flanges 84 and 104 are engaged tightly with each other and the assembly forms a substantially rigid intermediate pole member.

Referring again to FIGS. 14, 15 and 17, the flanges 84 and 104 of component parts 14 and 16 are sized in width so as to make a close sliding fit with adjacent portions of stepped side walls 28 and 60 of outermost pole member 2, except that a short distance from their lower (inner) ends flanges 84 and 104 are enlarged in width so as to form shoulders 85 and 105 respectively that will be interrupted by the shoulders (see 29 in FIG. 8A) of the top stop described hereinabove.

Referring again to FIGS. 17 and 18, a narrow rib 107 is formed on the inner surface of base wall 100 of component part 16. Rib 107 commences at the top (outer) end of base wall and extends longitudinally for a selected distance. As explained hereinafter, rib 107 functions as a top (extended position) stop for innermost member 6.

Figure 22:
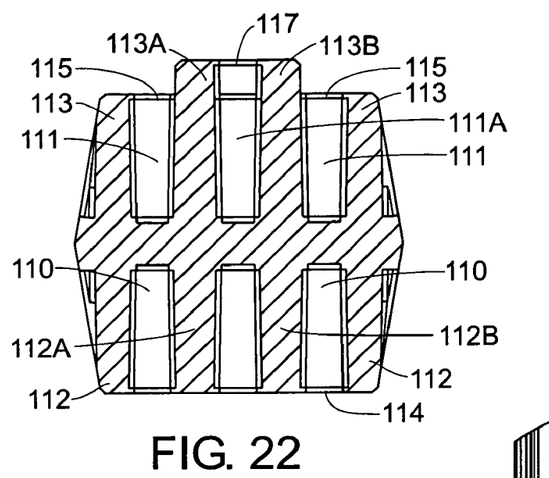
FIG. 22 is a sectional view taken a long line 22-22 of FIG. 21.
Figure 23:
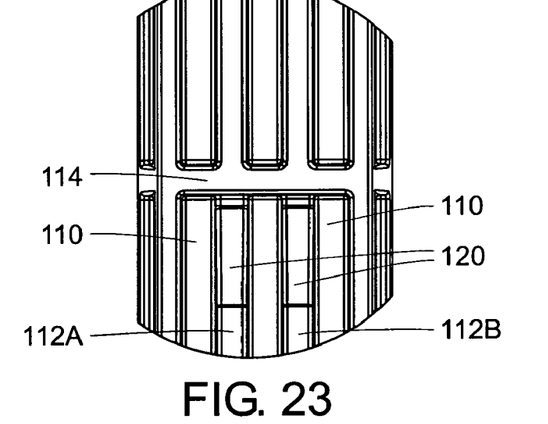
FIG. 23 is an enlargement of a portion of FIG. 21.
Figure 24:
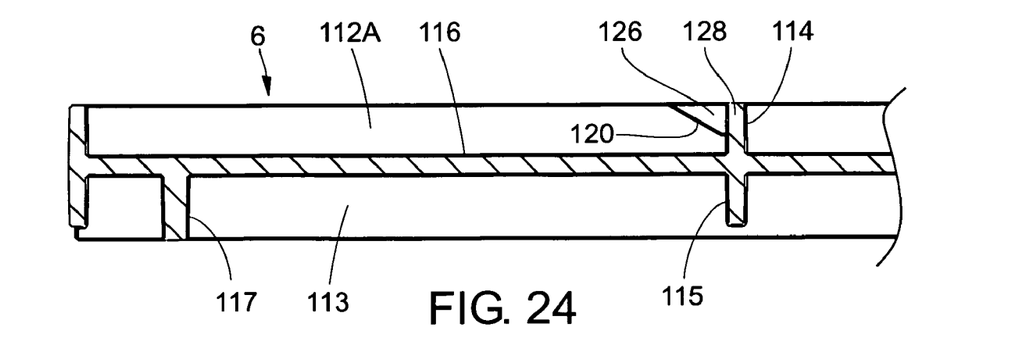
FIG. 24 is a longitudinal sectional view of a portion of the innermost pole member.
Figure 25:
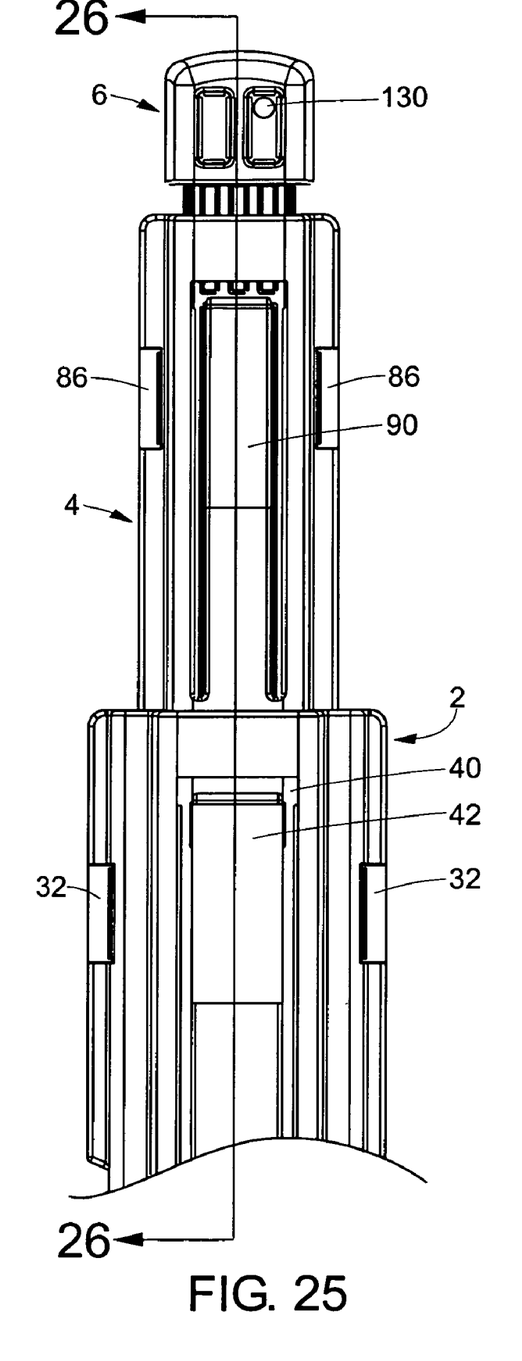
FIG. 25 is a fragmentary view in side elevation of the telescoping plant support pole.

Referring now to FIGS. 20-24, the top or innermost member 6 is formed as a solid rod with a polygonal cross-sectional configuration. Preferably, as shown, elongate member 6 is formed with a number of longitudinally-extending grooves 110 and 111, ribs 112 and 113, a number of transversely-extending ribs or wall sections 114 and 115 that extend across grooves 110 and 111 between ribs 112 and 113 respectively, and a longitudinally-extending center wall section 116. In the illustrated preferred embodiment of the invention, innermost member 6 is formed with four ribs 112 and 113, but the number of ribs and grooves may be varied. The presence of grooves 110 and 111 helps to reduce the amount of material required to form innermost member 6. At multiple locations along their length, the two inner ribs 112A and 112B are cut back at an angle adjacent selected transversely-extending wall sections 114, as shown at 120 in FIGS. 20 and 24, so as to form tapered recesses or slots 126 for receiving the locking projection of large locking tab 90 pf component part 14 of intermediate pole member 4A. At their deepest (top end), recesses 126 are terminated by an end wall 128 (FIG. 24) that extends perpendicular to longitudinally-extending wall section 116. The top (outer) end of elongate member 6 is preferably enlarged so as to form a knob 118 for grasping that member and pulling it out axially in a telescoping movement relative to member 4A. As seen in FIG. 22, on the side of pole member 6 opposite to the side that has locking tab recesses 126, the two centermost ribs 113A and 113B project outwardly of the body of that pole member. Additionally adjacent the inner end of pole member 6 a transverse wall section 117 extends between and is joined to ribs 113A and 113B. Wall member 117 projects beyond the outer edges of wall sections 115 so as to engage rib 107 when innermost pole member 6 is extended, thereby acting as a top (extended position) stop for pole member 6. Preferably a through hole 130 is provided in knob 118 to accommodate a string for tying the top of the pole to a growing plant.

Referring now to FIGS. 1-4, 18 and 25-27, intermediate pole member 4 and innermost pole member 6 are sized to make a close sliding fit inside of pole members 2 and 4 respectively. The base and side walls of component halves 14 and 16 of intermediate pole member 4 are aligned with the corresponding walls of component halves 10 and 12 of pole member 2, and the exterior surfaces of innermost pole member 6 slidably engage the inner surfaces of component parts 14 and 16, with ribs 113A and 113B disposed in a longitudinally extending recess 101 (FIG. 18) formed by the junction of base wall 100 and stepped side walls 102 of component part 16, and stop rib 107 disposed in groove 111A between ribs 113A and 113B.

Figure 27:
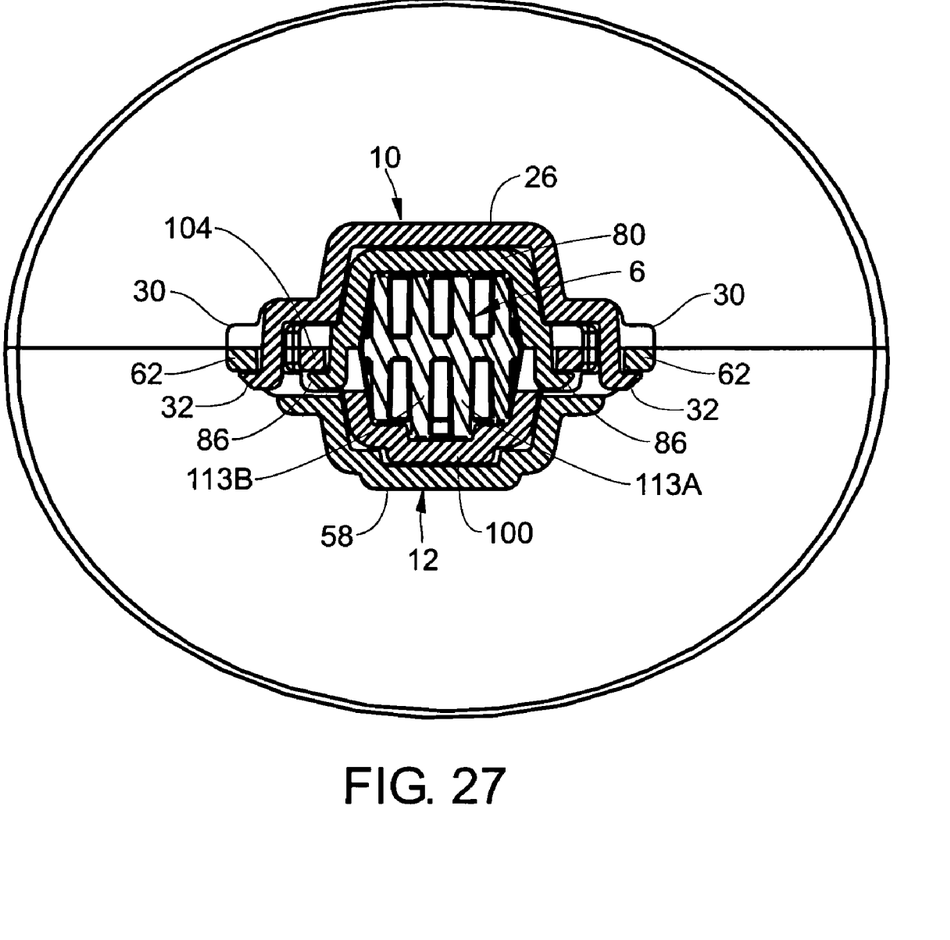
FIG. 27 is a cross-sectional view taken along line 27-27 of FIG. 25.

The pole is assembled by first positioning innermost pole member 6 between component parts 14 and 16 of pole member 4 and then securing the latter parts to each other by inserting locking tabs 86 into holes 106. Innermost member 6 is oriented so that the center groove 111A is aligned with and slidably accommodates rib 107 and so that its ribs 113A and 113B make a sliding fit in recess 101 formed in the inner surface of base wall 100 (FIG. 18). Thereafter the component parts 10 and 12 of outermost pole member 2 are assembled around intermediate member 4 so that their base walls 26 and 58 are aligned with the base walls 80 and 100 of component parts 14 and 16 respectively, as shown in FIG. 27. Component parts 10 and 123 are then secured to one another by inserting locking tables 32 into openings 64.

As it is obvious from the foregoing description, when pole member 2, 4 and 6 are assembled in telescoping relation, the intermediate member 4 cannot rotate on its axis relative to the outermost member 2, and the innermost (top) member 6 cannot rotate on its axis relative to intermediate member 4. The lengths of the three pole members may be varied. Preferably the length of innermost member 6 is set so it can be telescoped into member 4 far enough for its knob 118 to be relatively close to but spaced from the top (rearward) end of intermediate member 4 in the manner shown in FIG. 25, while the length of intermediate member 4 is set so that all but a short top end portion, e.g., 2-5 inches long, can be telescoped into elongate member 2. In this preferred embodiment, the actual depth to which pole members 4 and 6 can be telescoped into fully retracted position is determined by interlocking of locking tabs 42 and 90 with the perpendicular end walls 98 and 128 of the uppermost recesses 96 and 126 of pole members 4 and 6 respectively. By way of example, but not limitation, members 2, 4 and 6 have such that when the three pole sections are locked in fully extended position, the pole will have an overall length of approximately 72 inches.

Assuming that the pole is in its fully retracted position, it is extended by pulling one or both of pole members 4 and 6 outwardly from pole member 2. Locking tabs 42 and 90 ride on the exterior surfaces of pole members 4 and 6 respectively until their locking projections fall into locking relation with one of the locking recesses 96 and 126 respectively. Preferably intermediate member 4 and innermost member 6 are provided with at least two recesses 96 and 129 spaced along their lengths so as to allow the assembled pole to be locked in a variety of extended positions.

In practice, the stake section of pole member 2 is inserted into the soil surrounding a growing plant by pushing down on it, with the flange sections 30 and 66 limiting the depth of penetration and stabilizing the pole in a vertical position. Assuming that locking tabs 42 and 90 are positioned in one of the recesses 96 and 126 respectively, the end walls 98 and 128 of those recesses will act on those large locking tabs to prevent the pole from collapsing from a full or partially extended position to a retracted position as the pole is pressed into the soil. If locking tabs 42 and/or 90 are interlocked with recesses 96 and/or 126 respectively, all that is required to move pole member 4 and/or 6 from a given extended position to a more retracted position is for the user to grasp locking tab 42 and/or 90 outwardly far enough to clear recesses 96 and 126 respectively, after which those pole members may be retracted to a different tab locking position.

The foregoing construction offers a number of advantages. A primary advantage resides in the fact that the stake portion 22 of pole member 2 facilitates penetration of the earth adjacent to a growing plant, while its flanges 34 and 66 serve to limit the depth of penetration and also to stabilize the pole so as to hold it in a vertical position, as is desired in order to adequately support the growing plant. A second advantage of the invention is that the pole has a variable length, plus means for releasably locking the elongate members in several different telescoped positions. A further advantage is that the pole is made of a plastic material, so that unlike a wooden stake, it will not degrade with continued presence in the ground. The specific construction of the invention as herein described and illustrated offers the further advantage that the parts can be injection molded with precision. In this connection it should be noted that making each of the elongate members 2 and 4 in two parts is an economical advantage since the molds required to make them are less complex and costly than a mold required to make an elongate tubular member, particularly if the tubular member is required to have an internal or external surface that is not cylindrical. The component parts of pole members 2 and 4 are readily made by injection molding, and that mode of manufacturing is preferred although some other method, e.g., compression molding, may be used. While poles made according to this invention are especially useful in supporting growing plants that produce food, e.g., tomato plants, they also are useful in supporting growing other plants, e.g. flowering plants of a purely ornamental or aesthetic value, shrubs and small trees. Furthermore the poles of this invention may be molded in different colors and may be used to support plants are indoors or outdoors. Still other advantages and uses will be obvious to persons of ordinary skill in the art.

It is to be appreciated that the invention is subject to changes that are obvious to persons skilled in the art. Thus, for example, the pole may be made with only two pole members or with more than three pole members. Additionally, the cross-sectional shape of each of the elongate members may be varied, e.g., the inner and or outer surfaces of the telescoping pole members may have a different configuration than the configurations disclosed herein, provided, however, that the telescoping members are limited in their ability to rotate on their axes so as to assure, for example, that the relatively large locking tabs 42 and 92 will remain in alignment with the complementary locking recesses 96 and 126 as herein described. Also the number of locking recesses 96 and 126 in pole members 4 and 6 respectively may be varied according to the desired number of possible extended pole positions. Another possible alternative construction is to form the stakes section in two mating halves, one half section including flange 34 on the part 10 and the other half section including flange 66 on the part 12. However, for strength purposes, the stake construction illustrated in figure is 1-5 is preferred. Another possible modification is to replace the solid innermost pole member 6 with a tubular pole member. It also is contemplated that a glue may be applied to the mating surfaces of component parts 10 and 12 and also to mating surfaces of component parts 14 and 16 to assure that they will not separate from one another. Still other modifications obvious to a person of ordinary skill in the art may be made without departing from the essence of the invention.

What is claimed is:

1. A telescoping pole for supporting a growing plant comprising:

first and second elongate pole members made of a polymer plastic material, said first pole member being tubular and said second pole member extending within and being in telescoping relation with said first pole member, said first pole member having a tapered end stake section whereby to facilitate the pole penetrating the ground adjacent to the growing plant;

said first pole member having a flexible locking tab formed integral therewith; and said second pole member being formed with a first recess located at a selected position along its length for receiving said locking tab so as to lock said first and second pole members in a first extended telescoped position;

wherein at least said first pole member comprises first and second complementary semi-tubular parts that are secured together by at least one snap lock connection.

2. A telescoping pole according to claim 1 wherein said second pole member has another recess located at another selected position along its length for receiving said locking tab so as to lock said first and second pole members in a second extended telescoped position.

3. A telescoping pole according to claim 1 wherein at least one of said pole members has an external surface with at least one notch for receiving a flexible tie for securing a growing plant to said pole.

4. A telescoping pole according to claim 1 further wherein said first semi-tubular part is formed with a plurality of interlock tabs spaced along its length and said second part is formed with a plurality of openings spaced along its length for receiving said interlock tabs in an interlocking relation.

5. A telescoping pole according to claim 1 further including means for preventing said second pole member from rotating on its longitudinal axis relative to said first pole member.

6. A telescoping pole according to claim 1 wherein said tapered end stake section is an integral part of said first pole member.

7. A telescoping pole according to claim 6 wherein said first elongate member is tubular except for said tapered end stake section.

8. A telescoping pole according to claim 7 wherein said tapered end stake section comprises a plurality of blade-shaped fins disposed about the longitudinal axis of said first pole member.

9. A telescoping pole according to claim 8 wherein said stake section has an upper and a lower end, and includes a flange formed integral with and extending between the upper ends of said fins for limiting the depth of penetration of said stake section in the ground adjacent to a growing plant.

10. A telescoping pole for supporting a growing plant comprising:

first and second elongate pole members made of a polymer plastic material, said first pole member being tubular and said second pole member extending within and being in telescoping relation with said first pole member, said first pole member having a tapered end stake section whereby to facilitate the pole penetrating the ground adjacent to the growing plant;

said first pole member having a flexible locking tab formed integral therewith; and said second pole member being formed with a first recess located at a selected position along its length for receiving said locking tab so as to lock said first and second pole members in a first extended telescoped position;

wherein at least said second pole member comprises first and second complementary semi-tubular parts that are secured together by at least one snap lock connection.

11. A telescoping pole according to claim 10 wherein said first semi-tubular part of said second pole member is formed with a plurality of interlock tabs spaced along its length and said second semi-tubular part of said second pole member is formed with a plurality of openings spaced along its length for receiving said interlock tabs in an interlocking relation.

12. A telescoping pole for supporting a growing plant comprising:

first and second elongate pole members made of a polymer plastic material, said first pole member being tubular and said second pole member extending within and being in telescoping relation with said first pole member, said first pole member having a tapered end stake section whereby to facilitate the pole penetrating the ground adjacent to the growing plant;

said first pole member having a flexible locking tab formed integral therewith; and said second pole member being formed with a first recess located at a selected position along its length for receiving said locking tab so as to lock said first and second pole members in a first extended telescoped position;

wherein said second pole member is tubular, and further comprising a third elongate pole member disposed within and in telescoping relation with said second pole member, said second pole member having a flexible locking tab formed integral therewith and said third pole member having at least a first recess located at a selected position along its length for receiving said locking tab of said second pole member so as to lock said third pole member in a first telescoped position relative to said second pole member; and further wherein said third member is a solid rod.

13. A telescoping pole according to claim 12 wherein said third pole member has at least a second recess located at another selected position along its length for receiving said locking tab of said second pole member tab so as to lock said third pole member in a second telescoped position relative to said second pole member.

* * * * *